United States Patent [19]

Mühle

[11] Patent Number: 4,646,416

[45] Date of Patent: Mar. 3, 1987

[54] METHOD FOR MANUFACTURING THERMO-INSULATED COMPOUND PROFILES FOR WINDOWS, DOORS AND FACADES

[76] Inventor: Manfred Mühle, D-4972 Löhne 2, Fed. Rep. of Germany

[21] Appl. No.: 662,294

[22] PCT Filed: Jan. 25, 1984

[86] PCT No.: PCT/DE84/00019

§ 371 Date: Sep. 21, 1984

§ 102(e) Date: Sep. 21, 1984

[87] PCT Pub. No.: WO84/02862

PCT Pub. Date: Aug. 2, 1984

[30] Foreign Application Priority Data

Jan. 31, 1983 [DE] Fed. Rep. of Germany ....... 3303094

[51] Int. Cl.⁴ ...................... B21D 39/00; B23P 17/00; B23P 19/04

[52] U.S. Cl. .................................. 29/509; 29/155 R; 29/433

[58] Field of Search .................. 29/509, 155 R, 243.5; 52/403

[56] References Cited

U.S. PATENT DOCUMENTS 3,606,658 9/1971 McConnell ...................... 29/155 R
4,194,284 3/1980 Diels et al. ........................... 29/509
4,213,236 7/1980 Diels et al. ........................... 29/433
4,245,384 1/1981 Egerer ................................. 29/433

FOREIGN PATENT DOCUMENTS 3025706 1/1982 Fed. Rep. of Germany .

*Primary Examiner*—Howard N. Goldberg
*Assistant Examiner*—Steven Nichols
*Attorney, Agent, or Firm*—Max Fogiel

[57] ABSTRACT

Method for fabricating thermo-insulated compound profiles for windows, doors and facades, wherein two metal profiles (8, 11) to be joined to the compound profile (13) are provided with longitudinal grooves wherein are inserted clamping battens (7) forming together with the metal profiles (8, 11) an insulation chamber (9) and which are secured at the base portion thereof engaged in the longitudinal grooves by deformation of the retainer bars (10, 12) limiting the longitudinal grooves. In order to provide, despite manufacturing tolerances of the metal profiles (8, 11) and of the clamping battens (7) an absolute dimensional precision as well as uniform strength properties of the compound profiles, and in order to be completely independent from all cross-sections, dimensions and shapes of profiles, it is convenient to proceed as follows: (a) draw unilaterally the clamping battens (7) into the corresponding longitudinal groove of one of the metal profiles (8, 11) to be interconnected, (b) deform the retainer bars (10) arranged in an insulation chamber (9), respectively the base portion of the retainer bars (10) flanking the clamping battens (7) which is engaged into a longitudinal groove, (c) push, as for a lid, the second metal profile (11) to the first metal profile (8), and (d) deform the retainer bars (12) extending outside the insulation chamber (9) to the base portion of the clamping battens (7) which are not yet secured into the longitudinal grooves.

2 Claims, 5 Drawing Figures

Figure 1:
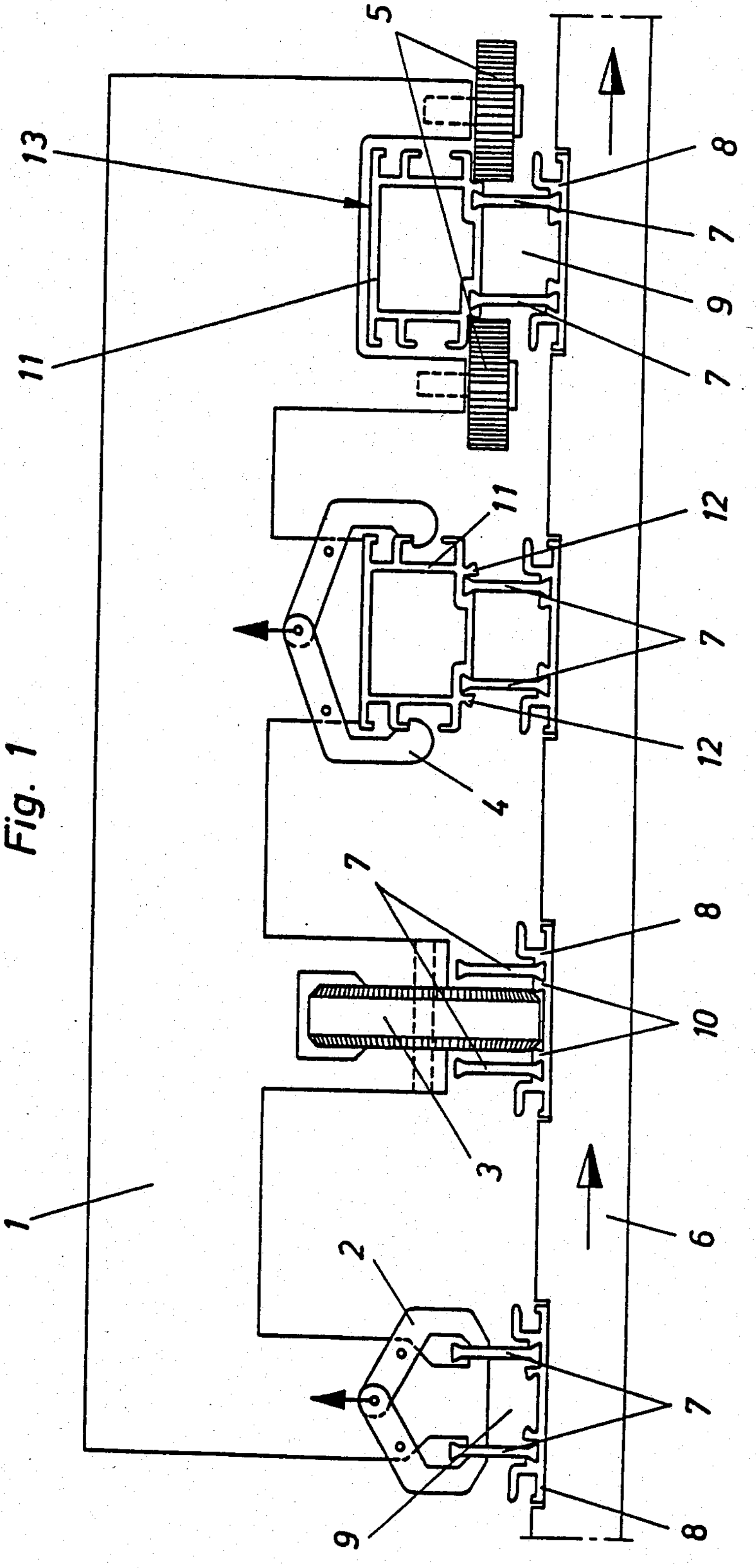

METHOD FOR MANUFACTURING THERMO-INSULATED COMPOUND PROFILES FOR WINDOWS, DOORS AND FACADES

The invention relates to a method for manufacturing thermo-insulated compound profiles for windows, doors and facades, wherein two metal profiles to be joined to form a compound profile are provided with longitudinal grooves into which connecting webs forming an insulating chamber together with the metal profiles are inserted, and secured at their base portions, engaging in the longitudinal grooves, by means of the deformation of the retaining strips bounding the longitudinal grooves.

Numerous methods of this type are known, especially from the printed matters German Auslegeschrift 2,559,599, German Auslegeschrift 2, 604, 670 and German Pat. No. 2,755,669. Both the German Auslegeschrift 2,559,599 and the German Auslegeschrift 2, 604, 670 make provision for a forming tool to be moved through between the insulating connecting webs in the profiled inside chamber formed by the connecting webs together with the metal profiles, the forming tool being intended to press the four retaining strips of the metal profiles pointing towards the profiled inside chamber simultaneously against the connecting webs. However, this results in obvious difficulties in compensating production tolerancies of the parts to be joined together, which in turn can result in the forming tool not applying the same pressure to all retaining strips, and consequently the compound profile does not receive adequate shear strength.

Whereas the German Auslegeschrift 2, 604, 670 does not take into account the above aspect, according to the German Auslegeschrift 2, 559, 599 the drawing mandrel used there for tolerence compensation is to be split in the longitudinal direction or equipped with fork-like legs, so that these mandrel parts can each be pressed individually under spring force. Apart from the costly construction of the drawing mandrel resulting from this, which in practice is scarcely possible to realise for compound profiles with small inside chambers, it still appears that no satisfactory production properties can be achieved by this, because in the German Pat. No. 2, 552, 700 originating in a divisional Application to the German Auslegeschrift 2, 559, 599 further expensive measures for improving such a type of compound profile have been claimed.

Although the method according to the German Pat. No. 2, 755, 699, also listed as prior art, is no longer encumbered with previously mentioned defects, it is not nearly suitable for every type of profile section to be met with; this especially applies when there are undercuts in the metal profiles. To this extent its application possibilities are severely limited, which in turn represents a quite considerable disadvantage.

The object of the invention is to develop a method for manufacturing thermo-insulated compound profiles, which, despite unavoidable production tolerancies of the metal profiles and connecting webs, insures absolute dimensional accuracy and uniform strength properties of the compound profiles manufactured in the manner according to the invention. In this connection, it is not only to be suitable for every profile section to be met with, but also for all profile sizes, in order to make it possible to retain already existing profile series and in order not to prevent the development of new profile forms. A further object of the invention is to create a device suitable for implementing the desired method, this device facilitating a continuous production sequence which is arranged for large quantities and is therefore cost effective.

The measures proposed with this invention for achieving the set objects follow from the patent claims.

The combined pressing, selected for the first time by this invention, over the inner and outer retaining strips with the base portions of the connecting webs inserted in the longitudinal grooves of the metal profiles provides the pre-condition for making it possible to manufacture each compound profile form without difficulty and completely unimpaired in strength by dimensional deviations of the parts to be joined together. Consequently this new type of method is clearly superior to all previously known manufacturing methods by on the one hand avoiding their disadvantages and on the other hand by combining their respective advantages.

Figure 2:
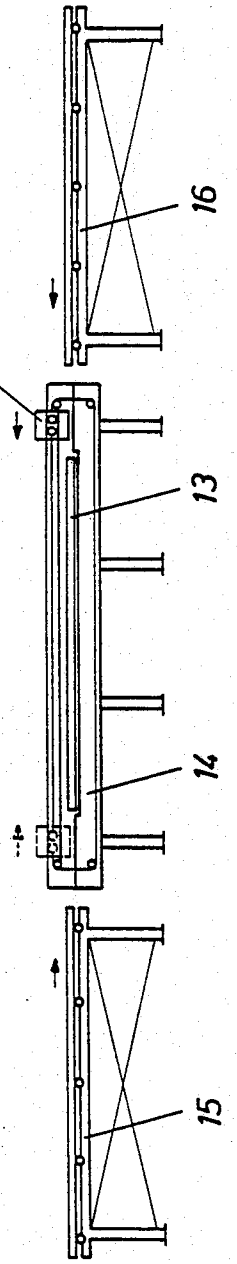
Figure 3:
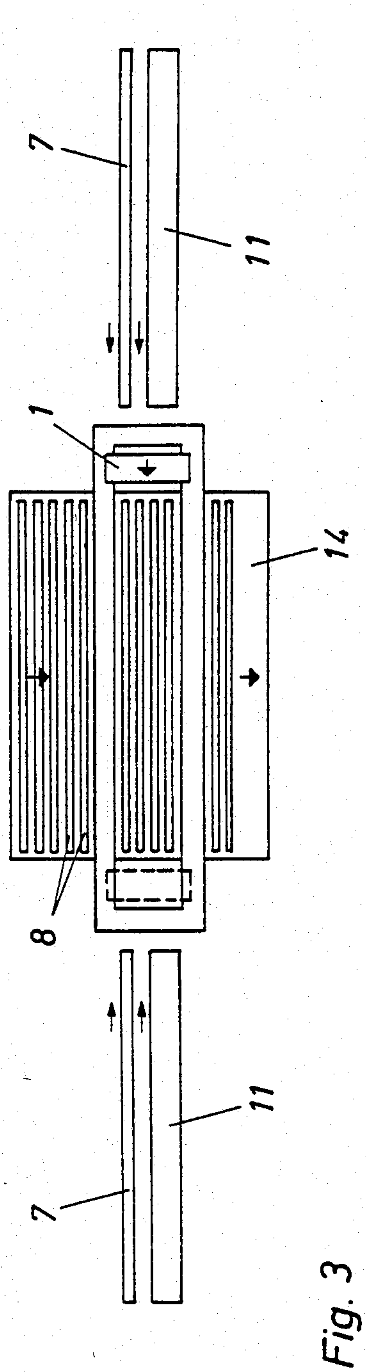
Figure 4:
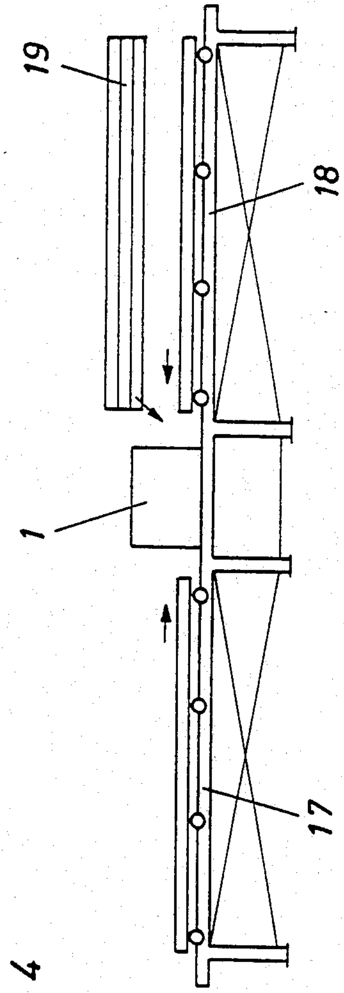
Figure 5:
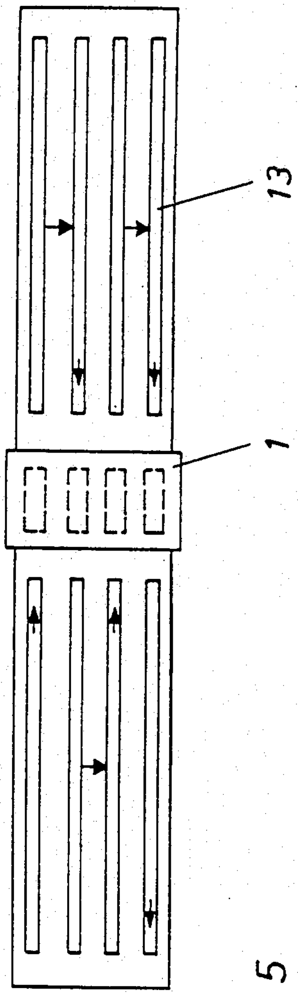

Illustrated embodiments of the invention are shown in the drawings, wherein in detail:

FIG. 1 shows a schematic representation of a production device combining the process steps according to the invention, FIG. 2 shows a side view of an installation constructed according to the production principle following from FIG. 1, FIG. 3 shows a plan view of the installation in FIG. 2, FIG. 4 shows the side view of a production device of a different design to that of the production device in FIGS. 2 and 3 and FIG. 5 shows a plan view of the installation in FIG. 4.

The production device schematically shown in FIG. 1 for manufacturing thermo-insulated compound profiles comprises as a main component a production head 1, by means of which all process steps of the invention can be combined in a single process operation. For this purpose, it is provided with a double clamp 2, a vertically located forming roller 3, a gripping clamp 4 and a horizontally located forming roller pair 5, which are located next to one another in the sequence of the process steps over a transport means 6 moving cyclically after every process step in a transverse direction to the production head 1.

According to the first process step to be performed, the double clamp 2 is used to draw in two connecting webs 7 into the corresponding longitudinal grooves of a first metal profile 8, which is fed on the transport means 6. Accordingly, this first metal profile 8, now provided with the connecting webs 7 subsequently forming the insulating chamber 9, moves in the direction of the arrow to the next production station. There, the vertically located forming roller 3 engages between the two connecting webs 7 and at the same time presses the inner retaining strips 10 of the metal profile 8, by which means the base portions of the connecting webs 7 are secured in the longitudinal grooves. In the third production station, the gripping clamp 4 then slips a second metal profile 11 lid-like onto the connecting webs 7, and in the fourth production station, the outer retaining strips 12 of the second metal profile 11 are pushed against the base portions, not yet secured, of the connecting webs 7 by forming rollers 5 located opposite one another in pairs. Consequently, the two metal profiles 8 and 11 and the connecting webs 7 are then joined to form the thermoinsulated compound profile 13 with the insulating chamber 9, the thermo-insulated compound profile 13 thereupon leaving the production device on the transport means 6 in the direction of movement of the latter.

While the first metal profile 8 runs through the four various stations of the production head 1, the transport means 6 constantly feeds in further metal profiles 8 so that finally four compound profiles 13 are always being manufactured simultaneously. In this way a continuous production sequence is achieved.

An installation equipped with the production head 1 explained with reference to FIG. 1 follows from FIGS. 2 and 3. In this installation, the production head 1 above a production table 14 can be moved in the longitudinal direction of the compound profiles 13 being worked on the production table 14. At the ends of its track are arranged feed devices 15 and 16 for the connecting webs 7 and metal profiles 11 to be drawn into or slipped onto the metal profiles 8 by the production head 1 alternately from the feed device 15 or the feed device 16.

In contrast to the previously described installation, the production device of the production head 1 which can be seen in FIGS. 4 and 5 is not movably attached but stationary between two longitudinal conveyors 17 and 18. By means of these two longitudinal conveyors 17 and 18, the compound profiles 13 located in production, in accordance with the arrows shown in FIG. 5, are moved through under the production head 1 alternately in both directions and in each case moved sideways by one production stage corresponding to the process steps, with the connecting webs 7 and metal profiles 11 to be drawn in or slipped on being fed from a feed magazine 19 allocated to a longitudinal conveyor 18. The advantage of an installation designed in this way is that, in its longitudinal extension, as compared with the design shown in FIGS. 2 and 3, it only needs to be twice the length of the compound profiles 13 instead of three times the length; this leads to very considerable space saving.

It would of course also be possible, in a different way to the previously described installations, to arrange the individual production stations of the production head 1 to be separate from one another, and to have the profiles to be produced run through these stations one after the other, although this would result in a greater spatial expansion of the installation. However, the production area could in turn be reduced if the device which is used to slip on lid-like the second metal profile 11 is also used to deform the retaining strips 12 outside the insulating chamber 9.

I claim:

1. Method for manufacturing thermo-insulated compound profiles for windows, doors and facades, comprising the steps of: providing two metal profiles to be joined to form a compound profile with longitudinal grooves; inserting into said grooves connecting webs forming an insulating chamber together with the metal profiles and secured at their base portions, said connecting webs engaging in said longitudinal grooves by deformation of retaining strips bounding said longitudinal grooves; drawing in on one side said connecting webs into the corresponding longitudinal groove of one of said metal profiles to be joined to one another; deforming the retaining strips directed towards the insulating chamber and flanking the base portion of the connecting webs engaging in a longitudinal groove; slipping one metal profile lid-like onto the other metal profile; and deforming the retaining strips running outside said insulating chamber at said base portions which are not yet secured in the longitudinal grooves of said connecting webs; said connecting webs being attached to a profile on the inside when the retaining strips of the connecting webs are not accessible from the outside of the profile, inner retaining strips being rolled by one inner roll and two oppositely-directed out rolls into a profile from the outside at the end of said method when said inner retaining strips cannot be deformed on the profile, so that compound profiles of every dimension can be produced independent of the cross-section of said profiles and independent of hollow spaces between said profiles, said profiles being worked on transport means moving in synchronism transverse to said profiles for carrying out the method continuously; combining all said steps in a common operation, and working simultaneously on at least four compound profiles; deforming the retaining strips to be pressed against said base portions of said connecting by a production head, said production head also drawing in said connecting webs into said longitudinal grooves of said other metal profile and slipping on lid-like said one metal profile onto the connecting webs already secured on one side in said other metal profile by moving said compound profiles cyclically after every method step relative to said production head.

2. Method as defined in claim 1, wherein said steps of slipping and deforming the retaining strips running outside said insulating chamber and deforming the retaining strips running outside said insulating chamber by a production head which also performs said step of slipping one metal profile lid-like onto the other metal profile.

* * * * *